United States Patent
Lagares Corominas

(10) Patent No.: US 10,064,414 B2
(45) Date of Patent: Sep. 4, 2018

(54) INJECTING MACHINE FOR INJECTING BRINE INTO MEAT PIECES

(71) Applicant: METALQUIMIA, S.A., Girona (ES)

(72) Inventor: Narcis Lagares Corominas, Besalu-Girona (ES)

(73) Assignee: METALQUIMIA, S.A., Girona (ES)

( * ) Notice: Subject to any disclaimer, the term of this patent is extended or adjusted under 35 U.S.C. 154(b) by 635 days.

(21) Appl. No.: 14/793,102

(22) Filed: Jul. 7, 2015

(65) Prior Publication Data
US 2015/0305356 A1 Oct. 29, 2015

Related U.S. Application Data

(63) Continuation-in-part of application No. 13/411,899, filed on Mar. 5, 2012, now abandoned.

(51) Int. Cl.
| | |
|---|---|
| *B02B 3/00* | (2006.01) |
| *A22C 9/00* | (2006.01) |
| *A22C 17/00* | (2006.01) |
| *A23B 4/28* | (2006.01) |

(52) U.S. Cl.
CPC .......... *A22C 9/001* (2013.01); *A22C 17/0053* (2013.01); *A23B 4/28* (2013.01); *Y02A 40/946* (2018.01)

(58) Field of Classification Search
CPC ..... A22C 9/001; A22C 9/008; A22C 17/0053; A23B 4/26; A23B 4/28; A23B 4/285; Y02A 40/946
USPC .................................. 99/485, 532, 533, 534
See application file for complete search history.

(56) References Cited

U.S. PATENT DOCUMENTS

| | | | |
|---|---|---|---|
| 4,074,389 A | 2/1978 | Blair et al. | |
| 5,449,524 A | 9/1995 | Ludwig | |
| 5,460,842 A | 10/1995 | Morgan | |
| 6,386,099 B1 * | 5/2002 | Otsuka | A22C 17/0053 99/487 |
| 6,658,990 B1 | 12/2003 | Henning et al. | |
| 6,901,850 B2 | 6/2005 | Corominas | |
| 7,172,781 B2 | 2/2007 | Kish | |
| 2003/0224093 A1 * | 12/2003 | Kish | A23B 4/02 426/478 |
| 2011/0308400 A1 | 12/2011 | Danwerth | |

* cited by examiner

*Primary Examiner* — Dana Ross
*Assistant Examiner* — Brandon Harvey
(74) *Attorney, Agent, or Firm* — RatnerPrestia

(57) ABSTRACT

A machine for injecting brine into meat pieces includes a conveyor having a support surface for conveying meat pieces in a forward step by step movement, each step having a predetermined length, first and second injection heads consecutively arranged over the conveyor relative to the forward direction, each injection head having an array of injection needles covering a whole width of the conveyor support surface. A length of the conveyor support surface corresponds to the predetermined length of the steps of the conveyor step by step movement, head driving device for alternately reciprocating the injection heads between an upper position, enabling the meat pieces to pass under the injection heads, and a lower position, where the injection needles are stuck into the meat pieces located under the injection heads, and brine supplying device supplying brine to the injection needles at least when the injection heads are at their lower position.

18 Claims, 5 Drawing Sheets

INJECTING MACHINE FOR INJECTING BRINE INTO MEAT PIECES

CROSS REFERENCE TO RELATED APPLICATIONS

This application is a Continuation-in-Part of U.S. application Ser. No. 13/411,899, filed Mar. 5, 2012, the contents of such application being incorporated by reference herein.

TECHNICAL FIELD

The present invention generally relates to an injecting machine for injecting brine into meat pieces and more in particular to an injecting machine having two or more injection heads for consecutively injecting brine into meat pieces conveyed on a conveyor.

BACKGROUND OF THE INVENTION

U.S. Pat. No. 6,901,850, which is incorporated by reference, discloses an injection head for an injecting machine intended for injecting brine to meat pieces on a support surface of a meat conveyor. The injection head comprises a main body and a plurality of parallel hollow needles that can be retracted with respect to the main body against elastic means acting on an upper end of each needle opposite the tip thereof. In the injecting machine, the head is actuated by driving means to vertically reciprocate between an upper position, in which the tip of said needles is at a distance from the support surface of the conveyor sufficient for enabling the meat pieces to pass under the injection heads, and a lower position, in which said lower needle portions of the needles are stuck into the meat pieces located under the injection heads. Brine supplying means are provided for supplying brine to an inlet opening of each needle when the injection heads are in said lower position.

It is also known to provide an injecting machine with two or more injection heads of the type described above installed at the same level over the support surface of the conveyor for consecutively injecting brine to meat pieces on the support surface of the conveyor in order to increase the amount of total brine injected into each meat piece. However, due to the fact that the volume of a meat piece increases significantly when brine is injected therein, in some instances a particular meat piece previously injected by the first injection head in relation to a conveyor forward direction cannot pass under the second injection head due to the volume increase undergone with the first brine injection. To solve this, the injection heads would need to have an enlarged stroke length between their upper and lower positions with increased manufacturing costs.

SUMMARY OF THE INVENTION

The present invention contributes to solve the aforementioned and other drawbacks by providing an injecting machine for injecting brine into meat pieces comprising a conveyor having a support surface for conveying meat pieces in a forward direction, and at least first and second injection heads consecutively arranged relative to said conveyor in said forward direction. Each of said first and second injection heads has an array of parallel hollow injection needles mounted thereon perpendicular to said support surface of the conveyor, wherein each injection needle has a longitudinal inner passage, at least one inlet opening in communication with said inner passage at an upper needle portion and a plurality of outlet openings in communication with the inner passage distributed along a lower needle portion. The injecting machine further comprises head driving means for reciprocating said first and second injection heads between an upper position, in which the tip of said needles is at a distance from said support surface of said conveyor sufficient for enabling the meat pieces to pass under the injection heads, and a lower position, in which said lower needle portions of the needles are stuck into the meat pieces located under the injection heads, and brine supplying means for supplying brine to said inlet opening of the needles at least when the first and second injection heads are in said lower position.

In one embodiment, the mentioned head driving means are arranged for alternately reciprocating said first and second injection heads so that when one of them is at said upper position the other one is at the lower position, and vice versa. In another embodiment, the mentioned head driving means are arranged for simultaneously reciprocating said first and second injection heads so that both of them are at the upper position and at the lower position at the same time. In any case, the first and second injection heads are installed at different heights over the conveyor so that the upper position of the first injection head is at a lower level in comparison with the upper position of the second injection head.

The upper position of the first injection head and the upper position of the second injection head are separated by an offset distance selected to enable the meat pieces previously injected by the first injection head to pass under the second injection head when it is in its upper position in spite of the volume increase undergone by the meat pieces due to the first brine injection, especially when the injection is intensive.

Both the first and second injection heads have substantially a same stroke length between their upper and lower positions so that said offset distance is also present between the lower position of the first injection head and the lower position of the second injection head. Preferable, when the first injection head is at its lower position the tips of the needles thereof are very close to the support surface of the conveyor, and as a result, when the second injection head is at its lower position the tips of the needles thereof are at said offset distance over the support surface of the conveyor. Preferably, the offset distance is selected to make the levels at which said outlet openings of the needles of the first injection head are positioned do not coincide with the levels at which the outlet openings of the needles of the second injection head are positioned when the first and second injection head are at their lower positions, so that brine is injected into the meat pieces by the second injection head at different levels than brine injected by the first injection head.

In the injection machine of the present invention, the first and second injection heads can be mutually identical. For example, injection heads of the type described in the cited U.S. Pat. No. 6,901,850 or similar can be used as the first and second injection heads.

The step by step movement of the support surface of the conveyor includes stops between consecutive steps, and each step has a predetermined length. The array of injection needles of each injection head covers a whole width of the support surface of the conveyor and a length of the support surface of the conveyor corresponding to said predetermined length of each steps of the step by step movement of the support surface of the conveyor. Each of the first and second injection heads alternately or simultaneously inject brine during each stop between consecutive steps of the step by step movement of the support surface of the conveyor, thereby all regions of all the meat pieces conveyed on the conveyor are injected twice: first by the first injection head; and then by the second injection head.

In one embodiment, the head driving means are configured to maintain at least one of the first and second injection heads at its lower position for a predetermined period of time and said brine supplying means are configured to supply brine to the needles of that injection head during said predetermined period of time and also during a portion of the backward movement of the injection head from its lower positions to the upper position.

The supply of brine is stopped when the injection head reaches an injection final position intermediate between the lower position and the upper position.

Obviously, said injection final position is selected so that a lower portion of the needles is still stuck into the meat piece being injected and all or the most of the outlet openings of the needles are within the meat piece, considering a meat piece average size, when the injection head is at the injection final position. Preferably, the head driving means are configured to move the corresponding injection head from its lower position to its injection final position at a slow motion and from its injection final position to its upper position at a fast motion. With this features, injected brine is evenly spread into the meat piece.

Preferably, the plurality of outlet openings of each needle are separated from one another in the longitudinal direction by an outlet opening distance, and the lower position and the injection final position are separated from one another in the head moving direction by an injection distance which is less than said opening distance. This also contributes to evenly spread the injected brine throughout the meat piece being injected. In one embodiment, the mentioned injection distance equals substantially a half of said outlet opening distance, and in another embodiment the injection distance is only a little less than the outlet opening distance.

Preferably, the aforementioned offset distance between the heights of the first and second injection heads is different from the outlet opening distance or from a multiple of the outlet opening distance to ensure that the levels at which the outlet openings of the needles of the first and second injection heads are positioned when the first and second injection heads are at their lower positions do not coincide.

It is to be understood that the feature of injecting brine during the predetermined period of time when the injection head is maintained at its lower position and also during a slow motion portion of the backward movement of the injection head from its lower position to its injection final position is also applicable to an injecting machine having a single injection head or two or more injection heads installed at the same level over the support surface of the conveyor.

In one embodiment in which injection is alternately performed by the first and second injection heads, the brine supplying means comprise a first pumping piston reciprocating within a first pump cylinder and a second pumping piston reciprocating within a second pump cylinder, wherein said first and second pumping pistons are driven by a common actuator so that the first pumping piston performs an injection stroke supplying brine to the injection needles of the first injection head at the same time that the second pumping piston performs a suction stroke suctioning brine from a brine tank, and the first pumping piston performs a suction stroke suctioning brine from said brine tank at the same time that the second pumping piston performs an injection stroke supplying brine to the injection needles of the second injection head.

BRIEF DESCRIPTION OF THE DRAWING

The above and other features and advantages will be more apparent from the following detailed description of an exemplary embodiment with reference to the attached drawings, in which.

DETAILED DESCRIPTION OF AN EXEMPLARY EMBODIMENT

Figure 1:
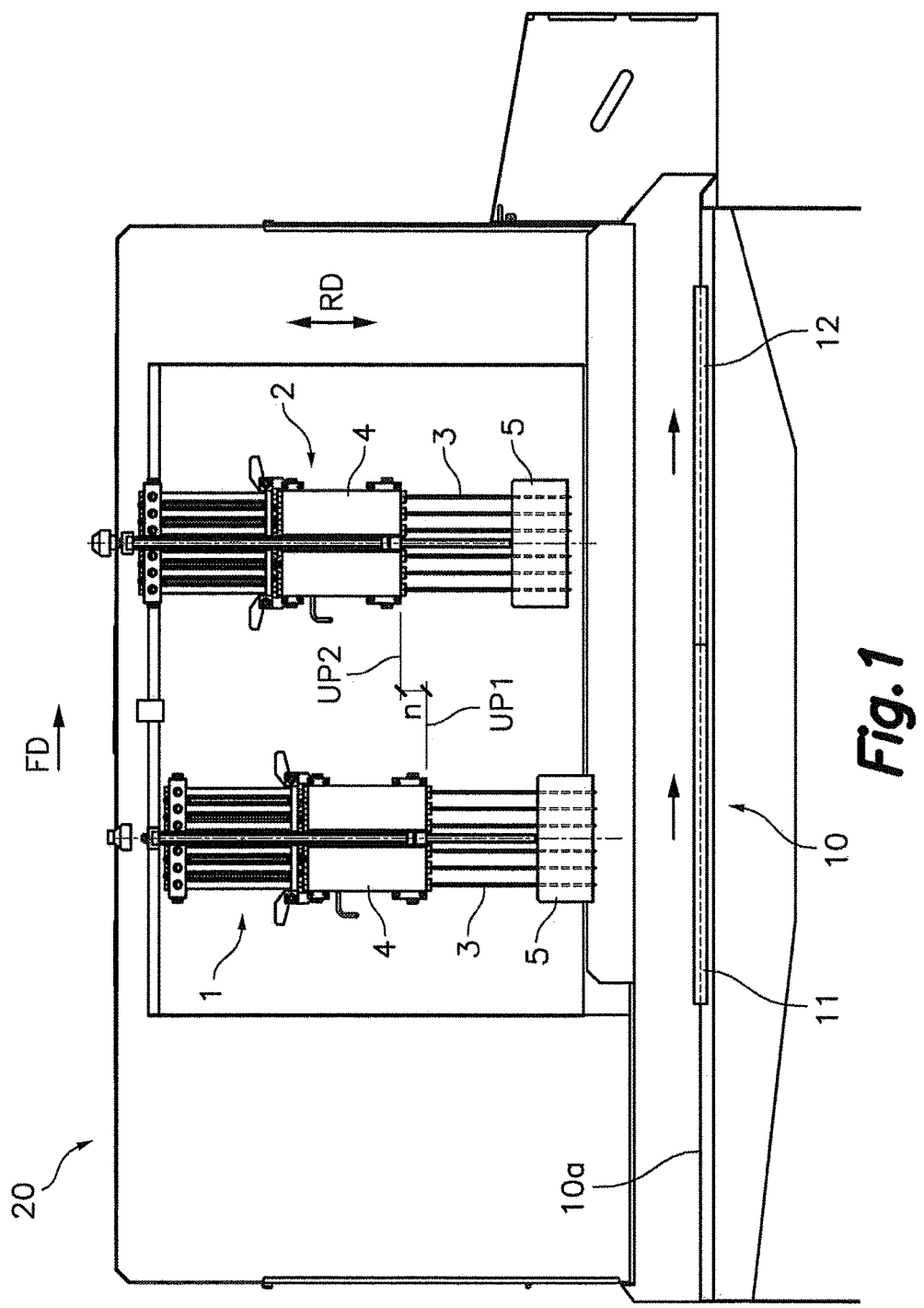
FIG. 1 is a diagrammatic side view of an injecting machine for injecting brine into meat pieces according to one embodiment of the present invention, in an operative situation wherein first and second injection heads are both shown at their upper positions.
Figure 2:
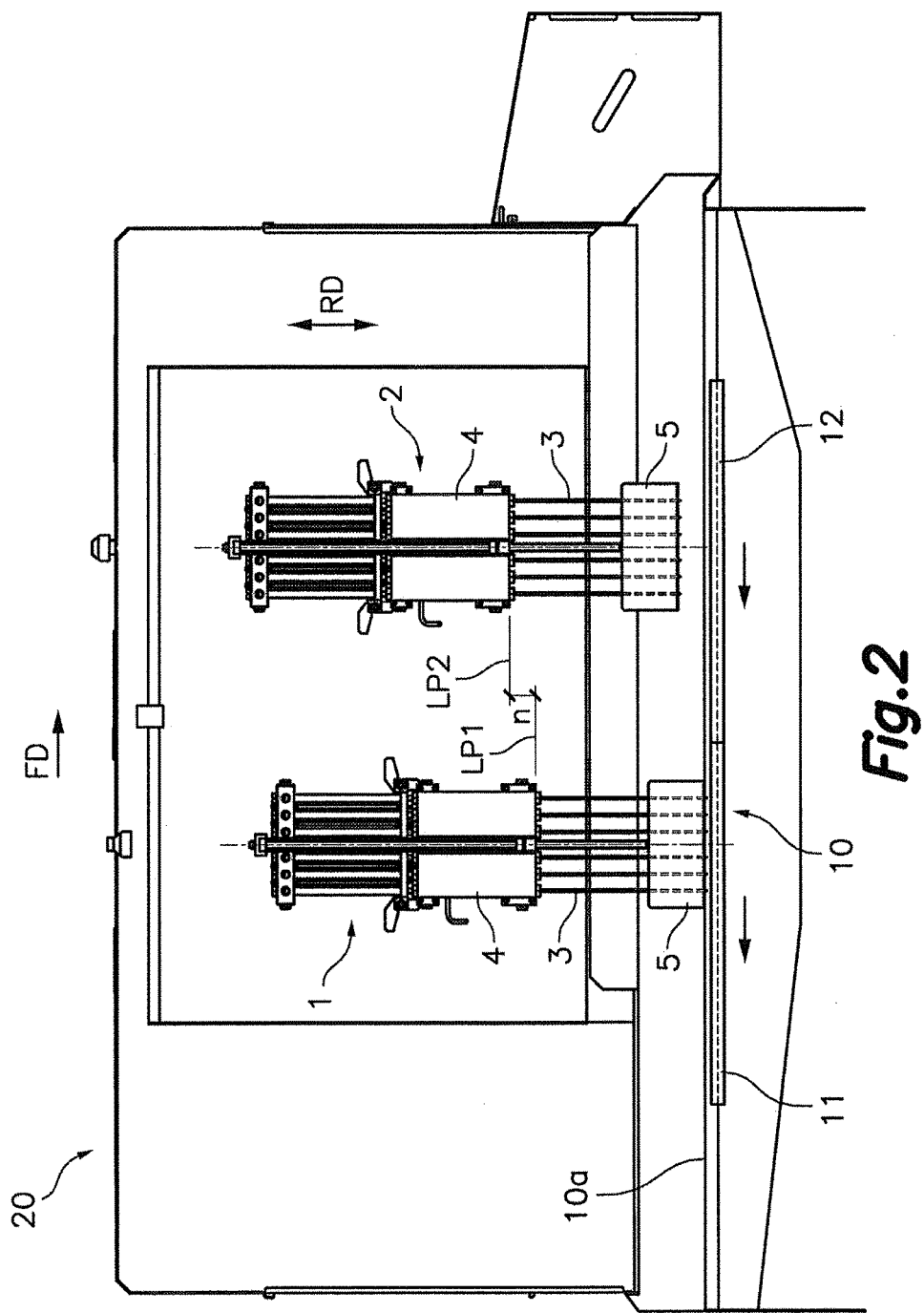
FIG. 2 is a diagrammatic partial side view of the injecting machine in an operative situation wherein the first and second injection heads are both shown at their lower positions.

Referring first to FIGS. 1 and 2, the reference sign 20 generally designates an injecting machine for injecting brine into meat pieces according to one exemplary embodiment of the present invention. The injecting machine 20 comprises a conveyor 10 having a support surface 10a for conveying meat pieces in a forward direction FD, and first and second injection heads 1, 2 arranged one after the other over said conveyor 10 relative to said forward direction FD.

The first and second injection heads 1, 2 are identical, and each of them has an array of parallel hollow injection needles 3 perpendicular to the support surface 10a of the conveyor 10 mounted on a main body 4. As conventional, each injection needle 3 has a longitudinal inner passage, at least one inlet opening in communication with said inner passage at an upper needle portion and a plurality of outlet openings 3a (FIGS. 3 and 4) in communication with the inner passage distributed at regular distances d along a lower needle portion.

The main bodies 4 of the first and second injection heads 1, 2 are connected to head driving means (not shown) configured to vertically reciprocate the first and second injection heads 1, 2 between respective upper positions UP1, UP2 (FIGS. 1-3), in which the tips of the injection needles 3 are at a distance from said support surface 10a of the conveyor 10 sufficient for enabling the meat pieces to pass under the injection heads 1, 2, and a lower position LP1, LP2 (FIGS. 1-5), in which said lower needle portions of the injection needles 3 are stuck into the meat pieces located under the injection heads 1, 2. Both first and second injection heads 1, 2 are shown at their upper positions UP1, UP2 in FIG. 1 and at their lower positions LP1, LP2 in FIG. 2. The vertical reciprocating direction is perpendicular to the forward direction FD and is indicated by means of a double arrow RD in the Figures.

The mentioned head driving means can comprise, for example, hydraulically actuated first and second cylinder and piston assemblies connected to the first and second injection heads 1, 2, respectively, to move the first and second injection heads 1, 2 along vertical guides, or first and second electric motors or servo-motors connected to the first and second injection heads 1, 2, respectively, by means of first and second mechanical transmissions such as belt and pulley transmissions, rack and pinion transmissions, crank and connecting rod transmissions, cam and cam follower transmissions, or combinations thereof, to move the first and second injection heads 1, 2 along vertical guides. The injection machine comprises control means, such as a hydraulic pilot valve system or a computer or a programmable logic controller, depending on the kind of the head driving means utilized, which control the operation of the head driving means.

Each of the first and second injection heads 1, 2 further comprises a conventional hold-down block 5 having a plurality of openings through which the injection needles 3 are inserted. The hold-down block 5 is connected by elastic means to the main body 4 so that the hold-down block 5 can be retracted to the main body 4 by the meat piece when the corresponding first or second injection head 1, 2 is at its lower position LP1, LP2 and the injection needles 3 are stuck into the meat piece. The hold-down block 5 aids to release the stuck meat piece when the injection head is moved back to its upper position. Also as conventional, the injection needles are arranged so that they can be individually retracted with respect to the main body against elastic means acting on an upper end of each injection needle opposite the tip thereof, for example in the case of the injection needle touches a hard portion, as for example a bone, when sticks into the meat piece.

Figure 5:
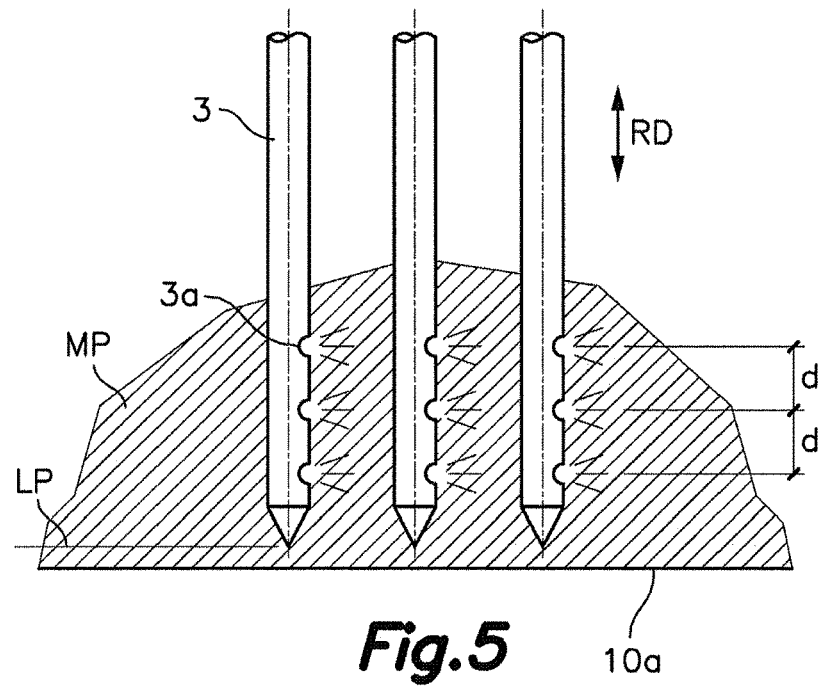
FIG. 5 is an enlarged diagrammatic partial side view of lower portions of the needles of one of the injection heads stuck into a meat piece when the injection head is at the lower position.
Figure 6:
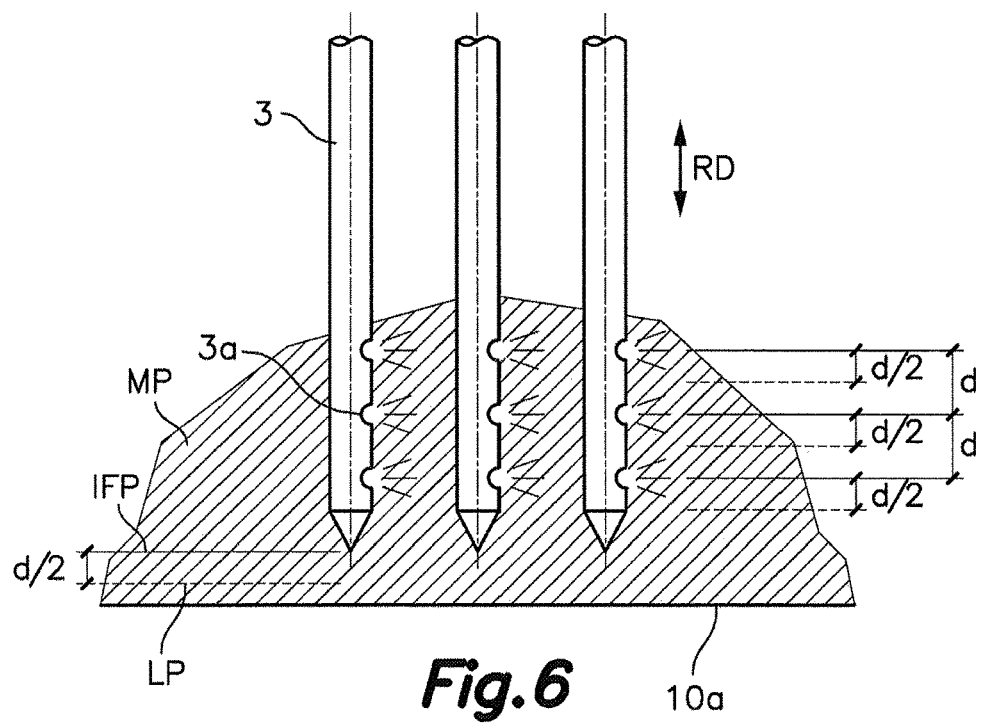
FIG. 6 is an enlarged diagrammatic partial side view similar to FIG. 5 when the injection head is at an injection final position between the lower position and the upper position.

The injecting machine 20 further comprises brine supplying means (FIG. 7) for supplying brine to said inlet opening of the injection needles 3 at least when the first and second injection heads 1, 2 are in said lower position LP1, LP2 in order to inject brine into the meat piece through the outlet openings 3*a* of the injection needles 3 (FIGS. 5 and 6).

In an operation mode shown in FIGS. 1 and 2, the head driving means are actuated to simultaneously reciprocate the first and second injection heads 1, 2 between their upper and lower positions, so that when the first injection head 1 is at its upper position UP1 the second injection head is at also at its upper position UP2 and when the first injection head 1 is at its lower position LP1 the second injection head is also at its lower position LP2

Figure 3:
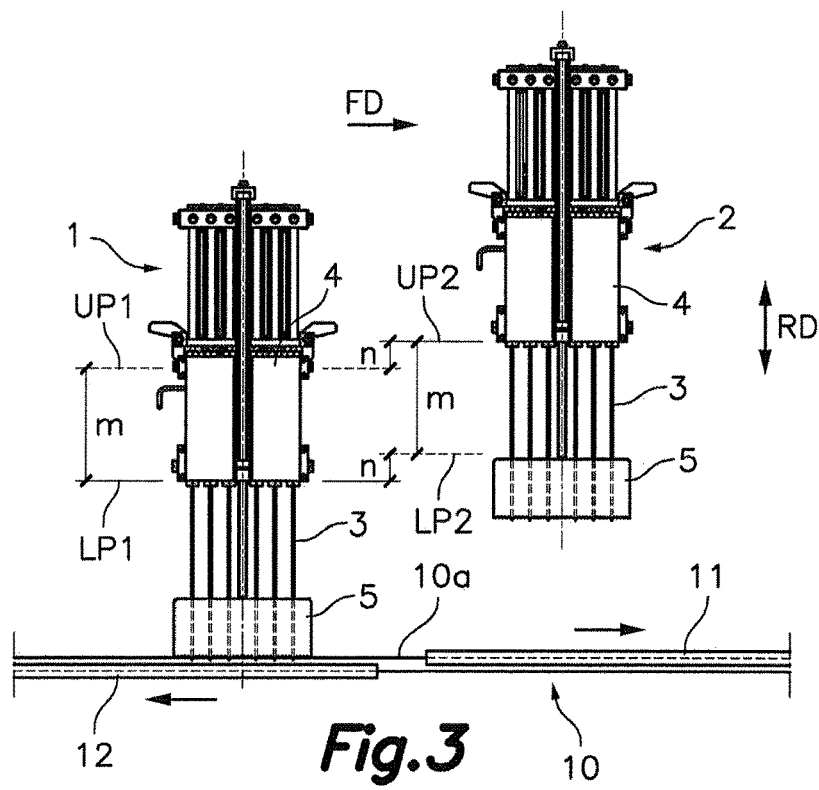
FIG. 3 is a diagrammatic partial side view of the injecting machine in an operative situation with the first injection head at its lower position and the second injection head at its upper position.
Figure 4:
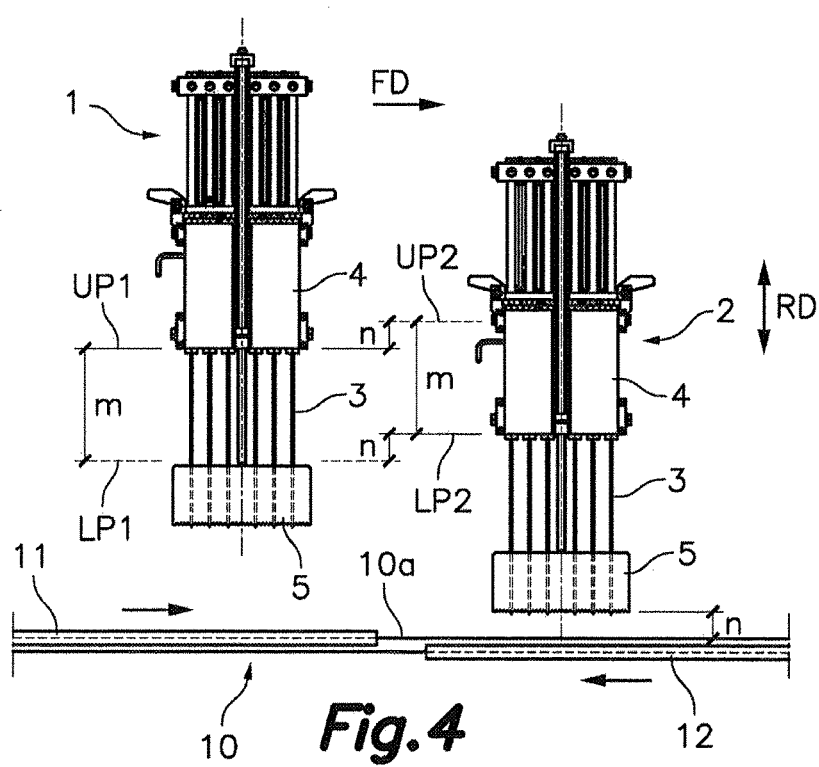
FIG. 4 is a diagrammatic partial side view of the injecting machine in another operative situation with the first injection head at its upper position and the second injection head at its lower position.

In an alternative operation mode shown in FIGS. 3 and 4, the head driving means are actuated to alternately reciprocate said first and second injection heads 1, 2 between their upper and lower positions, so that when the first injection head 1 is at its lower position LP1 the second injection head is at its upper position UP2 (FIG. 3), and vice versa, when the first injection head 1 is at its upper position UP1 the second injection head is at its lower position LP2 (FIG. 4). In FIGS. 3 and 4, the upper positions UP1, UP2 and lower positions LP1, LP2 for each of the first and second injection heads 1, 2 are indicated taking as a reference the level of the lower end of the respective main bodies 4. In FIG. 3, the upper position UP1 of the first injection head 1 and the lower position LP2 of the second injection head 2 are indicated with dashed reference lines. Inversely, in FIG. 4, the lower position LP1 of the first injection head 1 and the upper position UP2 of the second injection head 2 are indicated with dashed reference lines.

The conveyor 10 has two advancing units 11, 12 which are actuated in a known manner for intermittently advancing the meat pieces step by step in the forward direction FD according to the reciprocating movements of the first and second injection heads 1, 2. The step by step movement of the surface 10*a* of the conveyor 10 includes stops between consecutive steps and each step has a predetermined length L (see FIG. 8) and the injection operation is performed during the stops between consecutive steps, so that the meat pieces are stopped on the support surface 10*a* of the conveyor 10 when they are stuck and injected by the injection needles 3 of the first and second injection heads 1, 2.

For example, as well known in the art, the support surface 10*a* of the conveyor 10 is provided by a plurality of stationary support bars arranged parallel to the forward direction FD, and each advancing unit 11, 12 comprises a plurality of advancing elements arranged intermediate the support bars and actuated by conveyor driving means to move between an upper position, in which the advancing elements protrude upwards from the top of the support bars (see on the left hand in FIG. 1), thus engaging the meat pieces, and a lower position, in which the advancing elements are at a lower level with respect to the support bars (see on the right hand in FIG. 1), thus leaving the meat pieces on the stationary support bars, and also to move in the forward direction FD when they are in the upper position and to move in an opposed backward direction when they are in the lower position.

In the operation mode shown in FIGS. 1 and 2, the two advancing units 11, 12 are simultaneously operated so that while both the first and second injection heads 1, 2 are at their upper positions (FIG. 1) both the first and second advancing units 11, 12, which are located below the first and second injection heads 1, 2, respectively, are at their upper position and moving forwards, and while both the first and second injection heads 1, 2 are at their lower positions (FIG. 2) both the first and second advancing units 11, 12 are at their is lower position and moving backwards so that the meat pieces located under the first and second injection heads 1, 2 are stopped.

In the alternative operation mode shown in FIGS. 3 and 4, the two advancing units 11, 12 are alternately operated so that while the first injection head 1 is at its lower position and the second injection head 2 is at its upper position (FIG. 3) the first advancing unit 11, which is located below the first injection head 1, is at its lower position and moving backwards so that the meat pieces located under the first injection head 1 are stopped, and the second advancing unit 12, which is located below the second injection head 2, is at its upper position and moving forwards so that the meat pieces located under the second injection head 2 are being advanced. FIG. 4 shows the inverse situation.

The mentioned conveyor driving means can comprise, for example, a common hydraulically actuated cylinder and piston assembly or independent hydraulically actuated cylinder and piston assemblies, or a common electric motor or servo-motor or independent electric motors or servo-motors connected to the two advancing units 11, 12 by means of mechanical transmissions such as belt and pulley transmissions, rack and pinion transmissions, crank and connecting rod transmissions, cam and cam follower transmissions, or combinations thereof, to cyclically move each of the two advancing units 11, 12 in the upward, forward, downward and backward directions. The conveyor driving means are controlled by the mentioned control means comprised in the injection machine.

The first and second injection heads 1, 2 are installed in the injecting machine 20 at different heights over the conveyor 10 so that the upper position UP1 of the first injection head 1 is at a lower level in comparison with the upper position UP2 of the second injection head 2. More in particular, the upper position UP1 of the first injection head 1 and the upper position UP2 of the second injection head 2 are separated by an offset distance n, which is selected to enable the meat pieces previously injected by the first injection head 1 to pass under the second injection head 2 when it is in its upper position UP2 in spite of having increased its volume due to the first brine injection, especially when injection has been intensive.

The mentioned offset distance n is more clearly shown in FIGS. 1 and 2, wherein the first and second injection heads 1, 2 are shown both at their upper positions UP1, UP2 and lower positions Lp1, LP2, respectively.

As the first and second injection heads 1, 2 are identical, they have substantially a same stroke length m between the upper position UP1, UP2 and the lower position LP1, LP2, and this makes that the offset distance n is also present between the lower position LP1 of the first injection head 1 and the lower position LP2 of the second injection head 2. When the first injection head 1 is at its lower position LP1, the tips of the injection needles 3 thereof are very close to the support surface 10a of the conveyor 10 as shown in FIG. 3, and therefore, when the second injection head 2 is at its lower position LP2, the tips of the injection needles 3 thereof are substantially at said offset distance n over the support surface 10a of the conveyor 10.

The offset distance n is advantageously selected so that the levels at which the outlet openings 3a of the injection needles 3 of the first injection head 1 are positioned do not coincide with the levels at which the outlet openings 3a of the injection needles 3 of the second injection head 2 are positioned when the first and second injection head 1, 2 are at their respective lower positions LP1, LP2 in order to more evenly spread the injected brine throughout the meat piece.

Referring now to FIGS. 5 and 6, the head driving means are configured to maintain each injection head (only the lower portion of a few injection needles 3 of one of which is shown in FIGS. 5 and 6) at its lower position LP for a predetermined period of time, and then move at a slow motion the injection head from the lower position LP to an injection final position IFP lower than the upper position, and finally move at a fast motion the injection head from said injection final position IFP to its upper position (not shown in FIGS. 5 and 6). The brine supplying means are configured for supplying brine to the inlet opening of the injection needles 3 of the injection head during said predetermined period of time when it remains at the lower position LP and also during the slow motion portion of the backward movement of the injection head from the lower position LP to the injection final position IFP. When the injection final position IFP is reached, the brine supplying means stop to supply brine to the injection needles 3 and the head driving means speed up to move the injection head up to the upper position with a fast motion.

FIG. 5 shows the lower portion of only a few injection needles 3 of one of the injection heads stuck in a meat piece MP when the injection head is in its lower position LP and brine is injected from the outlet openings 3a, and FIG. 6 shows the lower portion of the same injection needles 3 still stuck in the meat piece MP but after the injection head has been moved from the lower position LP to the injection final position IFP and when brine is about of being stopped to be injected from the outlet openings 3a. In FIG. 6, the level of lower position LP and the levels of the outlet openings 3a when the injection head was at the lower position LP is indicated with dashed reference lines.

Note that the injection final position IFP is selected so that the lower portion of the injection needles 3 where the outlet openings 3a are formed is still stuck into the meat piece MP being injected so that all or the most of the outlet openings 3a of the injection needles 3 are still within the meat piece MP, considering a meat piece average size, when the injection head reaches the injection final position IFP.

The plurality of outlet openings 3a are arranged along each injection needle 3 at an outlet opening distance d from one another in the longitudinal direction thereof, and the injection final position IFP is distanced from the lower position LP in the needle longitudinal direction an injection distance d/2 which substantially equals a half of said outlet opening distance d, with the result of brine injected from the outlet openings 3a of the injection needles 3 being substantially evenly spread throughout the meat piece MP. In an alternative embodiment (not shown), said injection distance is preferably comprised between a half of the outlet opening distance d and the outlet opening distance d, for example a little less than outlet opening distance d. In another alternative embodiment (not shown), the injection distance is less than a half of the outlet opening distance d.

It is to be understood that for the sake of clarity only one row of longitudinally aligned outlet openings 3a arranged at one side of the injection needles 3 is shown in FIGS. 5 and 6. However, actually there are usually a plurality of rows of longitudinally aligned outlet openings 3a arranged at different sides of the injection needles 3, and the outlet openings 3a of the different rows are usually arranged at different levels.

Figure 7:
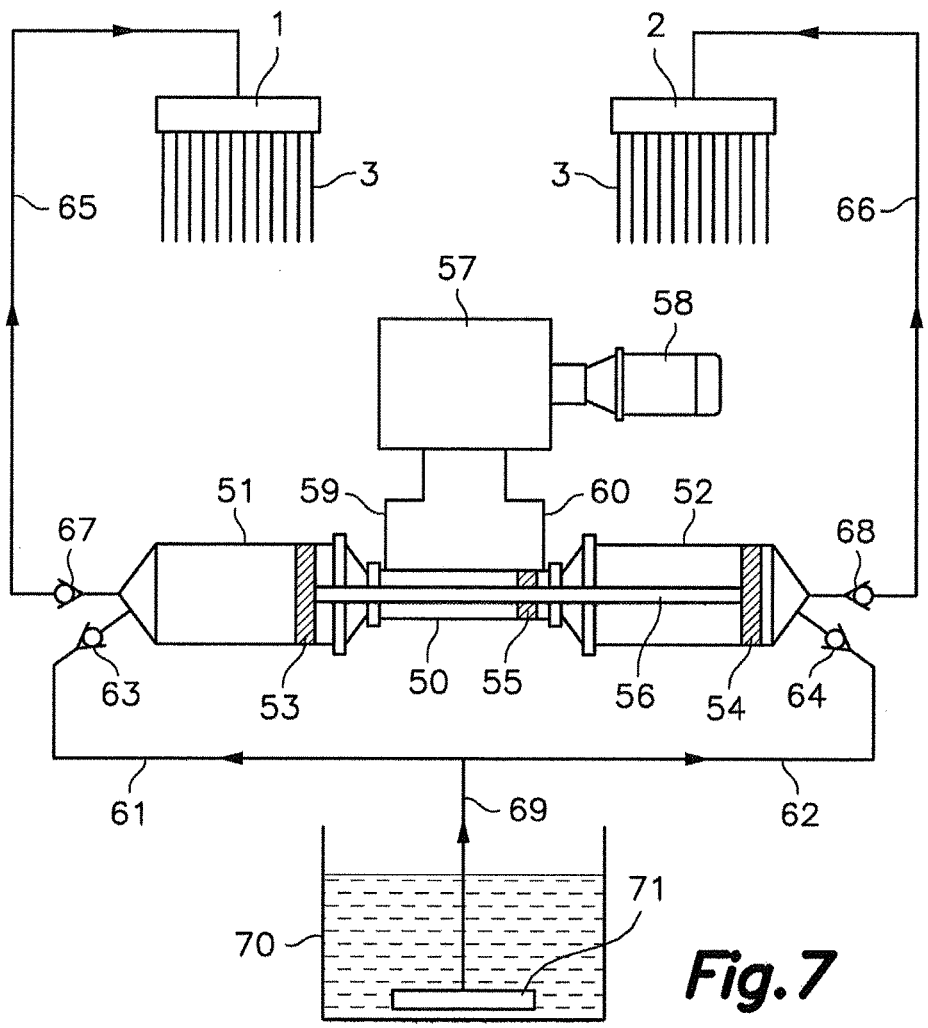
FIG. 7 is a diagram showing brine supplying means used for alternately feeding brine to the first and second injection heads.

FIG. 7 shows an exemplary embodiment of the brine supplying means used for alternately feeding brine to the first and second injection heads 1, 2 in the operating mode in which first and second injection heads 1, 2 are alternately driven (FIGS. 3 and 4). In this exemplary embodiment, the brine supplying means comprise a first pumping piston 53 reciprocating within a first pump cylinder 51 which supplies brine to the injection needles 3 of the first injection head 1 when the first pumping piston 53 is actuated to perform an injection stroke and a second pumping piston 54 reciprocating within a second pump cylinder 52 which supplies brine to the injection needles 3 of the second injection head 2 when the second pumping piston 54 is actuated to perform an injection stroke. The first and second pumping pistons 53, 54 are actuated by a common actuator.

The first and second pump cylinders 51, 52 are coaxially arranged at opposite ends of an actuation cylinder 50 of the common actuator, and an actuating piston 55 is located in a reciprocating manner within the actuation cylinder 50. The first pumping piston 53, the second pumping piston 54 and the actuating piston 55 are connected to a common piston rod 56.

A hydraulic unit 57 actuated by an electric motor 58 alternately supplies hydraulic fluid into the actuation cylinder 50 at opposite sides of the actuating piston 55 by means of hydraulic hoses 59, 60, thereby causing the actuating piston 55 to reciprocate within the actuation cylinder 50 and the first and second pumping pistons 53, 54 to reciprocate within the first and second pump cylinders 51, 52, respectively.

The first and second pump cylinders 51, 52 have respective inlets connected to first and second inlet ducts 61, 62 which are in connection with a suction duct 69 having an inlet through a filter 71 submerged in brine contained in a brine tank 70. The first and second inlet ducts 61, 62 have respective first and second non-return inlet valves 63, 64. The first and second pump cylinders 51, 52 have respective outlets connected to first and second outlet ducts 65, 66 which are in communication with the injection needles 3 of the first and second injection heads 1, 2, respectively. The first and second outlet ducts 65, 66 have respective first and second non-return outlet valves 67, 68.

When the hydraulic unit 57 is activated to move the actuating piston 55 towards a first direction within the actuation cylinder 50 (for example to the left in FIG. 7), the first pumping piston 53 performs an injection stroke within the first pump cylinder 51 thereby the first non-return inlet valve 63 is closed and the brine within the first pump cylinder 51 is impelled by the first pumping piston 53 to the first injection head 1 through the first outlet duct 65 and corresponding first non-return outlet valve 67, while at the same time the second pumping piston 54 performs a suction stroke within the second pump cylinder 52 thereby the second non-return outlet valve 68 is closed and brine is suctioned by the second pumping piston 54 from the brine tank 70 into the second pump cylinder 52 through the suction duct 69, second inlet duct 62 and corresponding second non-return inlet valve 64.

Similarly, when the hydraulic unit 57 is activated to move the actuating piston 55 towards a second opposite direction within the actuation cylinder 50 (for example to the right in FIG. 7), the first pumping piston 53 performs a suction stroke within the first pump cylinder 51 thereby the first non-return outlet valve 67 is closed and brine is suctioned by the first pumping piston 53 from the brine tank 70 into the first pump cylinder 51 through the suction duct 69, first inlet duct 61 and corresponding first non-return inlet valve 63 while at the same time the second pumping piston 54 performs an injection stroke within the second pump cylinder 52 thereby the second non-return inlet valve 64 is closed and the brine within the second pump cylinder 52 is impelled by the second pumping piston 54 to the second injection head 2 through the second outlet duct 66 and corresponding second non-return outlet valve 68.

Cyclical reciprocation of the hydraulically operated actuating piston 55 towards the first and second directions provides alternate dosed shots of brine to the injection needles 3 of the first and second injection heads 1, 2 to be injected to the meat pieces MP at a high pressure in comparison with conventional brine pumps. Alternatively, the hydraulic unit 57 can be substituted by a pneumatic unit or any other type of power unit to move the actuating piston 55 within the actuation cylinder 50. The operation of the brine supplying means is controlled by the control means comprised in the injection machine.

In the operation mode shown in FIGS. 1 and 2, where the first and second injection heads 1, 2 are simultaneously driven by the head driving means, the brine supplying means can comprise a single piston pump or two independent piston pumps for supplying brine to the injection needles 3 of the first and second injection heads 1, 2 at the same time. In one embodiment (not shown) the brine supplying means include essentially the same elements shown in FIG. 7 but with the first and second pump cylinders 51, 52 arranged in parallel and oriented in the same direction with the first and second pumping pistons 53, 54 connected to respective piston rods connected to one another and actuated at unison by the actuating piston 55 reciprocating within the actuation cylinder 50.

Figure 8:
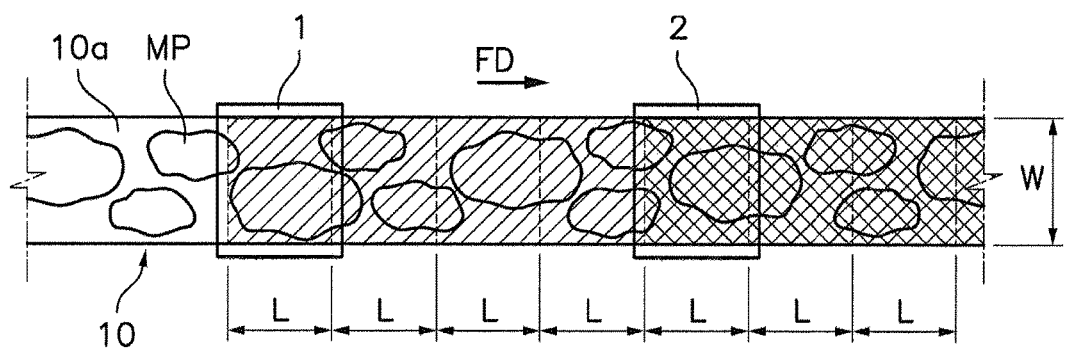
FIG. 8 is a diagrammatic plan view showing the successive injection of brine to the meat pieces on the support surface of the conveyor by the first and second injection heads.

As diagrammatically shown in FIG. 8, the support surface 10a of the conveyor 10 conveys the meat pieces MP in a step by step movement in the forward direction FD, wherein each step of the step by step movement has a length equal to the length L. The array of injection needles 3 of each first and second injection head 1, 2 covers a whole width W of the support surface of the conveyor and a length of the support surface 10a of the conveyor 10 equivalent to said predetermined length L of the conveyor steps. The head driving means and the brine supplying means are controlled by the control means in coordination with conveyor driving means so that both the first and second injection heads 1, 2 alternately or simultaneously inject brine to the meat pieces MP on the support surface 10a of the conveyor 10 during each stop between consecutive steps of the step by step movement thereof.

As a result, all regions of all the meat pieces MP conveyed on the support surface 10a of the conveyor 10 are injected twice: first by the first injection head 1; and then by the second injection head 2. In FIG. 8, the lengths L of the support surface 10a of the conveyor 10 over which brine is injected by the first injection head 1 are indicated by means of first shading lines inclined upwards and rightwards, and the lengths L of the support surface 10a of the conveyor 10 over which brine is injected by the second injection head 2 are indicated by means of second shading lines inclined upwards and leftwards. As clearly shown in FIG. 8, the length L corresponding to the position of the second injection head 2 and the lengths L downstream therefrom are indicated with crossed shading lines meaning that the meat pieced MP located thereon are injected twice with brine. In the example of FIG. 8, the second injection head 2 is positioned at a distance downstream from the first injection head which is a multiple of said predetermined length L, although this is not an essential condition.

Modifications and variations to the exemplary embodiment shown and described will readily occur to a person skilled in the art without departing from the scope of the present invention as it is defined in the attached claims.

The invention claimed is:

1. An injecting machine for injecting brine into meat pieces comprising:
 a conveyor having a support surface driven by conveyor driving means, said conveyor conveying meat pieces in a forward direction in a step by step movement including stops between consecutive steps, each step having a predetermined length;
 at least first and second injection heads consecutively arranged over said conveyor relative to said forward direction, each of said injection heads having an array of parallel injection needles perpendicular to said support surface of the conveyor, said array of injection needles covering a whole width of the support surface of the conveyor and a length of the support surface of the conveyor corresponding to said predetermined length of the steps of the step by step movement of the conveyor;
 head driving means reciprocating each of said first and second injection heads between an upper position, in which a tip of said injection needles is at a distance from the support surface of the conveyor enabling the meat pieces to pass under the injection head, and a lower position, in which lower needle portions of the injection needles are stuck into the meat pieces located under the injection head, each first and second injection head performing one cycle of movements from the upper position to the lower position and back to the upper position during each stop between consecutive steps of the step by step movement of the conveyor; and brine supplying means supplying brine to said injection needles at least when the first and second injection heads are at said lower position during each stop between consecutive steps of the step by step movement of the conveyor;

wherein all regions of all the meat pieces conveyed on the conveyor are injected twice: first by the first injection head; and then by the second injection head.

2. The injecting machine according to claim 1, wherein the first and second injection heads are installed at different heights over the conveyor, with the upper position of the first injection head being at a lower level than the upper position of the second injection head, and wherein an offset distance n is provided between the upper position of the first injection head and the upper position of the second injection head and a stroke length between the upper and lower positions of both first and second injection heads is substantially the same so that said offset distance n is also present between the lower position of the first injection head and the lower position of the second injection head.

3. The injecting machine according to claim 2, wherein each injection needle of each injection head has a longitudinal inner passage, at least one inlet opening in communication with said inner passage at an upper needle portion and a plurality of outlet openings in communication with the inner passage distributed at regular distances d along a lower needle portion, and the offset distance n is different from said distance d or a multiple of said distance d for making the level at which said outlet openings of the injection needles of the first and second injection heads are positioned when the first and second injection heads are at their lower positions do not coincide.

4. The injecting machine according to claim 2, wherein said head driving means maintain at least one of the first and second injection heads at its lower position for a predetermined period of time and said brine supplying means supply brine to the injection needles of that injection head during said predetermined period of time and during a portion of the backward movement of that injection head from its lower position to an injection final position lower than the upper position.

5. The injecting machine according to claim 4, wherein the head driving means are configured to move said at least one injection head from the lower position to said injection final position at a slow motion and from the injection final position to the upper position at a fast motion faster than said slow motion.

6. The injecting machine according to claim 5, wherein said plurality of outlet openings are arranged at an outlet opening distance from one another in the longitudinal direction of the injection needle, and an injection distance from the lower position to the injection final position is less than said outlet opening distance.

7. The injecting machine according to claim 6, wherein said injection distance from the lower position to said injection final position is substantially a half of said outlet opening distance.

8. The injecting machine according to claim 1, wherein the brine supplying means comprise a first pumping piston reciprocating within a first pump cylinder which supplies brine to the injection needles of the first injection head when said first pumping piston is actuated to perform an injection stroke and a second pumping piston reciprocating within a second pump cylinder which supplies brine to the injection needles of the second injection head when said second pumping piston is actuated to perform an injection stroke.

9. The injecting machine according to claim 8, wherein said first and second pump cylinders have respective inlets connected to first and second inlet ducts which are in communication with brine contained in a brine tank and respective outlets connected to first and second outlet ducts which are in communication with the injection needles of the first and second injection heads, respectively.

10. The injecting machine according to claim 9, wherein said first and second inlet ducts have respective first and second non-return inlet valves and said first and second outlet ducts have respective first and second non-return outlet valves.

11. The injecting machine according to claim 8, wherein the first and second pumping pistons are reciprocated within the corresponding first and second pump cylinders by a common actuator.

12. The injecting machine according to claim 8, wherein the first and second pumping pistons are coaxially arranged at opposite ends of an actuation cylinder, a reciprocating actuating piston is located within said actuation cylinder, and the first pumping piston, the second pumping piston and said actuating piston are connected to a common piston rod.

13. The injecting machine according to claim 12, wherein a hydraulic unit actuated by an electric motor is arranged to alternately supply hydraulic fluid into the actuation cylinder at opposite sides of the actuating piston, thereby causing the actuating piston to reciprocate within the actuation cylinder and the first and second pumping pistons to reciprocate within the first and second pump cylinders, respectively, so that when the first pumping piston performs an injection stroke the second pumping piston performs a suction stroke and when the first pumping piston performs a suction stroke the second pumping piston performs an injection stroke.

14. An injecting machine for injecting brine into meat pieces comprising:

a conveyor having a support surface driven by conveyor driving means, said conveyor conveying meat pieces in a forward direction in a step by step movement, with each step having a predetermined length;

at least first and second injection heads consecutively arranged over said conveyor relative to said forward direction, each of said first and second injection heads having an array of parallel injection needles perpendicular to said support surface of the conveyor, said array of injection needles covering a whole width of the support surface of the conveyor and a length of the support surface of the conveyor corresponding to said predetermined length of the steps of the step by step movement of the conveyor;

head driving means reciprocating each of said first and second injection heads between an upper position, in which a tip of said injection needles is at a distance from said support surface of said conveyor enabling the meat pieces to pass under the injection head, and a lower position, in which said injection needles are stuck into the meat pieces located under the injection head; and brine supplying means supplying brine to said injection needles at least when the first and second injection heads are at said lower position, said brine supplying means comprising a first pumping piston reciprocating within a first pump cylinder and a second pumping piston reciprocating within a second pump cylinder, said first and second pumping pistons being driven by a common actuator so that the first pumping piston performs an injection stroke supplying brine to the injection needles of the first injection head at the same time that the second pumping piston performs a suction stroke suctioning brine from a brine tank, and the first pumping piston performs a suction stroke suctioning brine from said brine tank at the same time that the second pumping piston performs an injection stroke supplying brine to the injection needles of the second injection head.

15. The injecting machine according to claim 14, wherein said first and second pump cylinders have respective inlets connected to first and second inlet ducts which are in communication with brine contained in the brine tank and respective outlets connected to first and second outlet ducts which are in communication with the injection needles of the first and second injection heads, respectively.

16. The injecting machine according to claim 15, wherein said first and second inlet ducts have respective first and second non-return inlet valves and said first and second outlet ducts have respective first and second non-return outlet valves.

17. The injecting machine according to claim 14, wherein the first and second pumping pistons are coaxially arranged at opposite ends of an actuation cylinder, a reciprocating actuating piston is located within said actuation cylinder, and the first pumping piston, the second pumping piston and said actuating piston are connected to a common piston rod.

18. The injecting machine according to claim 17, wherein a hydraulic unit is arranged to alternately supply hydraulic fluid into the actuation cylinder at opposite sides of the actuating piston.

* * * * *